US008018539B2

(12) United States Patent
Tsai et al.

(10) Patent No.: US 8,018,539 B2
(45) Date of Patent: Sep. 13, 2011

(54) PIXEL CIRCUIT STRUCTURE

(75) Inventors: Yi-Cheng Tsai, Chiayi County (TW); I-Fang Wang, Changhua County (TW); Wen-Chun Wang, Taichung (TW); Hen-Ta Kang, Taichung (TW); Kai-Lun Kuo, Taoyuan County (TW); Ming-Chang Yu, Taichung (TW); Wan-Jen Tsai, Taichung County (TW)

(73) Assignee: Wintek Corporration, Taichung (TW)

( * ) Notice: Subject to any disclaimer, the term of this patent is extended or adjusted under 35 U.S.C. 154(b) by 266 days.

(21) Appl. No.: 12/244,906

(22) Filed: Oct. 3, 2008

(65) Prior Publication Data

US 2009/0091670 A1 Apr. 9, 2009

(30) Foreign Application Priority Data

Oct. 5, 2007 (TW) ................................ 96137570 A

(51) Int. Cl.
*G02F 1/133* (2006.01)

(52) U.S. Cl. ........................................................ 349/38
(58) Field of Classification Search ..................... 345/92
See application file for complete search history.

(56) References Cited

U.S. PATENT DOCUMENTS

2006/0274008 A1 * 12/2006 Lin et al. ......................... 345/92

* cited by examiner

*Primary Examiner* — Sarah Hahm
(74) *Attorney, Agent, or Firm* — Thomas|Kayden

(57) ABSTRACT

A pixel circuit structure applied in an LCD panel, which has a common voltage and includes at least one data line, is provided. The pixel circuit structure includes a first and a second circuit. The first circuit includes a first switch and a first capacitor. The second circuit includes a second switch, a third switch and a second capacitor. One end of the first capacitor receives the common voltage. Two ends of the first switch are respectively coupled to the data line and the other end of the first capacitor. The second and the third switch are coupled serially between the data line and a voltage source. One end of the second capacitor receives the common voltage, and the other end is coupled between the second and the third switch. The potential difference between the two ends of the first capacitor is different from that of the second capacitor.

11 Claims, 3 Drawing Sheets

PIXEL CIRCUIT STRUCTURE

This application claims the benefit of Taiwan application Serial No. 96137570, filed Oct. 5, 2007, the subject matter of which is incorporated herein by reference.

BACKGROUND OF THE INVENTION

1. Field of the Invention

The invention relates in general to a pixel circuit structure, and more particularly to a pixel circuit structure applied in a liquid crystal display panel.

2. Description of the Related Art

The consumption market of consumer electronic products, such as personal digital assistants (PDAs), mobile phones, laptops, projectors, and even large-size flat panel televisions, expands rapidly in recent years, and therefore facilitates the increment of the quantity demanded for liquid crystal display (LCD) panel. Further, along with the maturity of the market and the progress of the technology, consumers are demanding for higher and higher display quality of LCD panels.

Referring to FIG. 1, a perspective of a single pixel in a conventional transflective LCD panel is illustrated. Generally, the conventional transflective LCD panel 10 includes an upper substrate 14, a lower substrate 11 and a liquid crystal (LC) layer 15 filled between the upper substrate 14 and the lower substrate 11. The single pixel of the transflective LCD panel 10 has a transmissive area a1 and a reflective area a2. The transflective LCD panel 10 further includes an organic layer 16 which is disposed at a location on the lower substrate 11 corresponding to the reflective area a2. A transparent electrode 12 and a reflective electrode 17 are disposed on the surface of the lower substrate 11. The transparent electrode 12 is substantially situated in the transmissive area a1, and the reflective electrode 17 is substantially situated in the reflective area a2. The transparent electrode 12 and the reflective electrode 17 are electrically connected to each other. Further, a common electrode 13 is disposed on the surface of the upper substrate 14. The aligning direction of LC molecules is changed according to the magnitude of the voltages applied to the transparent electrode 12 and the reflective electrode 17 relative to the common electrode 13. The source light e1 provided by the backlight module 20 passes through the lower substrate 11 and the transparent electrode 12 in the transmissive area a1 to enter the transflective LCD panel 10, and then goes through the LC layer 15, the common electrode 13 and the upper substrate 14 in order to display pictures. The ambient light e2 passes through the upper substrate 14 and the common electrode 13 to enter the transflective LCD panel 10, and the entered light reflects off the reflective electrode 17 as reached, and then the reflected light passes through the common electrode 13 and the upper substrate 14 again to leave the transflective LCD panel 10.

The light transmittance of the LC layer 15 changes in accordance with the alignment of the LC molecules, and the display component may show multiple grayscale brightness by controlling the voltages applied to the transparent electrode 12 and the reflective electrode 17 relative to the common electrode 13. The organic layer 16 is provided with a thickness, making the gap d2 in the reflective area a2 smaller than the gap d1 in the transmissive area a1. Therefore, the source light e1 in the transmissive area a1 and the ambient light e2 in the reflective area a2 have the same light path difference, so as to improve the optical characteristics of the LC layer 15. However, utilizing the dual gap structure lowers the yield rate, and leads to increases in the manufacturing complexity and the cost. Moreover, the overall uniformity of contrast, color saturation and light transmittance of the transflective LCD panel 10 may be degraded due to the uneven thickness of the organic layer 16 in the dual gap structure.

In addition, transmissive or transflective multi-domain vertical alignment (MVA) technology is often applied in LCDs to meet the demands of features including high contrast ratio, fast response, and wide-viewing angle.

Conventionally, transmissive or transflective MVA LCDs can achieve wide-viewing angles. However, transmissive or transflective MVA LCDs would lead to an undesirable phenomenon of color shift. That is, when a user views the transmissive or transflective MVA LCD with a large viewing-angle, the color of the image viewed by the user would be washed out.

SUMMARY OF THE INVENTION

The invention is directed to a pixel circuit structure. The liquid crystal capacitors respectively located in different regions of the pixel circuit structure have different potential differences, such that a single pixel circuit structure can have different voltage-transmittance curves, so as to increase the optical efficiency of liquid crystal layer in the LCD panel, further improving the display quality without adding additional process steps and costs.

According to the present invention, a pixel circuit structure applied in a liquid crystal display panel is provided. The liquid crystal display panel has a common voltage and includes at least one data line. The pixel circuit structure includes a first circuit and a second circuit. The first circuit includes a first capacitor and a first switch, and the second circuit includes a second switch, a third switch and a second capacitor. One end of the first capacitor receives the common voltage. Two ends of the first switch are respectively coupled to the data line and the other end of the first capacitor. The second switch and the third switch are coupled serially between the data line and a voltage source. One end of the second capacitor receives the common voltage, and the other end is coupled between the second and the third switch. The two ends of the first capacitor have a first potential difference, and the two ends of the second capacitor have a second potential difference that is different from the first one.

According to the present invention, another pixel circuit structure applied in a liquid crystal display panel is provided. The liquid crystal display has a common voltage and includes at least one data line. The pixel circuit structure includes a first circuit and a second circuit. The first circuit includes a first switch and a first capacitor, and the second circuit includes a second switch, a third switch and a second capacitor. One end of the first capacitor receives the common voltage. The first, second and third switches are coupled serially between the data line and a voltage source. The other end of the first capacitor is coupled between the first switch and the second switch. One end of the second capacitor receives the common voltage, and the other end is coupled between the second and third switches. The two ends of the first capacitor have a first potential difference, and the two ends of the second capacitor have a second potential difference that is different from the first one.

The invention will become apparent from the following detailed description of the preferred but non-limiting embodiments. The following description is made with reference to the accompanying drawings.

DETAILED DESCRIPTION OF THE INVENTION

First Embodiment

The pixel circuit structure according to the present embodiment is applied in an LCD panel which includes many scan lines, many data lines and many pixel units, wherein each pixel unit preferably includes one pixel circuit structure of the present embodiment. The following elaboration will be made in accordance with a single pixel circuit structure, so as to clearly show the characteristics of the pixel circuit structure according to the present embodiment.

Figure 1:
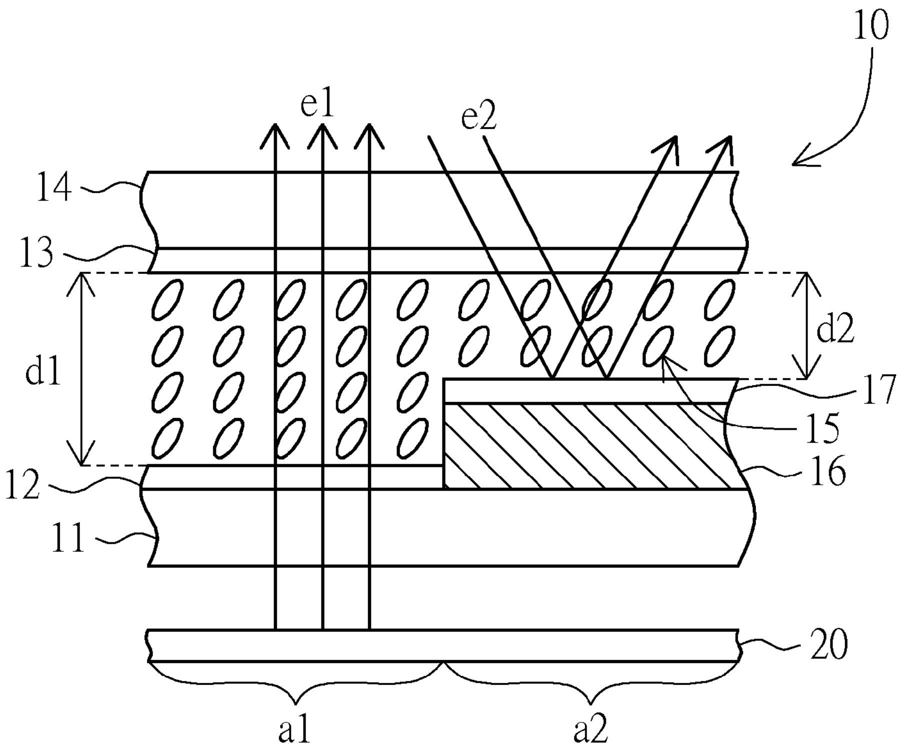
FIG. 1(PRIOR ART)
FIG. 1 is a perspective view of a pixel in a conventional transflective LCD panel.
Figure 2:
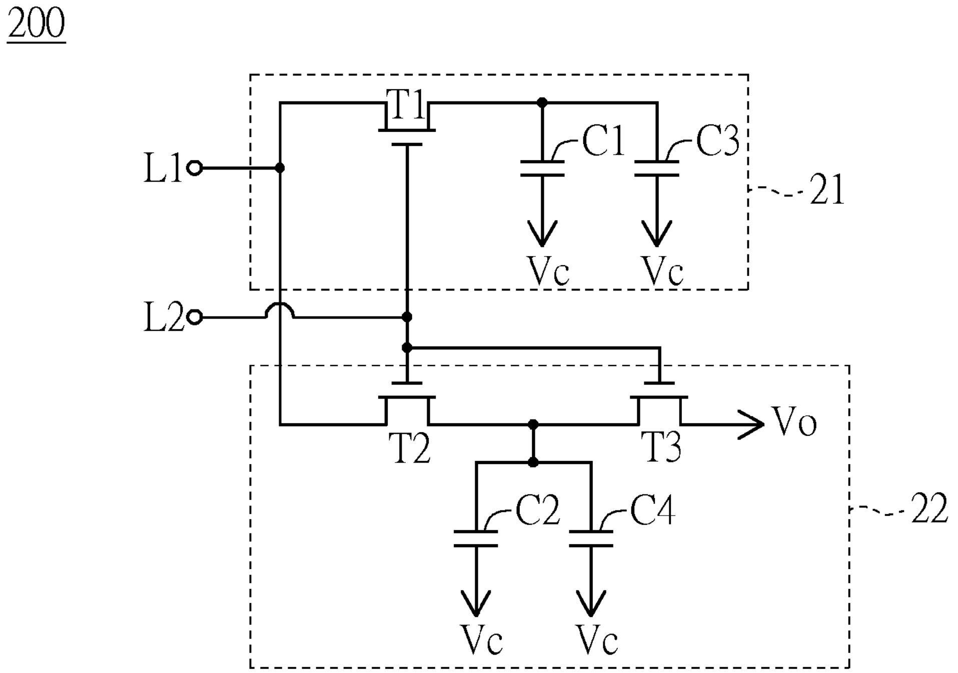
FIG. 2 is a perspective view of a pixel circuit structure according to the first embodiment of the invention.

Referring to FIG. 2, a perspective view of the pixel circuit structure according to the first embodiment of the invention is shown. The LCD panel adopting the pixel circuit structure 200 according to the present embodiment has a common voltage Vc and includes at least one data line L1. The pixel circuit structure 200 includes a first circuit 21 and a second circuit 22. The first circuit 21 includes a first switch T1 and a first capacitor C1. One end of the capacitor receives the common voltage Vc. Two ends of the first switch T1 are respectively coupled to the data line L1 and the other end of the first capacitor C1. The second circuit 22 includes a second switch T2, a third switch T3 and a second capacitor C2. The second switch T2 and the third switch T3 are serially coupled between the data line L1 and a voltage source Vo. One end of the second capacitor C2 receives the common voltage Vc, and the other end is coupled between the second switch T2 and the third switch T3. A partial voltage is produced between the second switch T2 and the third switch T3, and therefore the potential difference between the two ends of the first capacitor C1 is different from that between the two ends of the second capacitor C2.

More specifically, the first circuit 21 further includes a first storage capacitor C3. One end of the first storage capacitor C3 is coupled to one end of the first switch T1 and one end of the first capacitor C1. In the present embodiment, the other end of the first storage capacitor C3 receives the common voltage Vc for example, which indicates that the first storage capacitor C3 is a storage capacitor on common. In another example, the other end of the first storage capacitor C3 can also be coupled to a preceding scan line of an adjacent pixel circuit structure. That is, the first storage capacitor C3 can be a storage capacitor on gate as well. Further, the second circuit 22 includes a second storage capacitor C4. One end of the second storage capacitor C4 is coupled between the second and the third switches T2 and T3 as well as one end of the second capacitor C2. The second storage capacitor C4 can also be a storage capacitor on common or a storage capacitor on gate. In addition, the first capacitor C1 and the second capacitor C2 are liquid crystal capacitors. The first capacitor C1 is formed by the pixel electrode in the first display region, the common electrode of the LCD panel and liquid crystal layer disposed therebetween. The second capacitor C2 is formed by the pixel electrode in the second display region, the common electrode of the LCD panel and liquid crystal layer disposed therebetween. The voltage source Vo is an external signal source or the common electrode of the LCD panel for providing the common voltage Vc. The partial voltage, obtained at a point where the second capacitor C2 is coupled between the data line L1 and the voltage source Vo, can be changed in accordance with the adjustment to the potential of the voltage source Vo and with the alteration to the width to length (W/L) ratio of the second switch T2 and the third switch T3.

Further, the first switch T1, the second switch T2 and the third switch T3 can be implemented as thin-film transistors (TFT) for example. In this way, the first switch T1 has a control end in addition to the two ends that are respectively coupled to the data line L1 and the first capacitor C1. Likewise, the second and third switches T2 and T3 further have their control ends in addition to the two ends used for coupling to the data line L1 and the voltage source Vo. The control ends of the switches T1, T2 and T3 are individually coupled to the scan line L2 of the LCD panel, and the source end of the third switch T3 is coupled to the voltage source Vo. The LCD panel is exemplified by a transflective LCD panel in the present embodiment, and has at least one first display region and at least one second display region. For example, the first display region and the second display region can be the transmissive area and the reflective area of the LCD panel, respectively, or vice versa. The first circuit 21 and the second circuit 22 are correspondingly applied to the first display region and the second display region. One end of the first capacitor C1 is coupled to one end of the first switch T1, and the other end of the first capacitor C1 receives the common voltage. One end of the second capacitor C2 is coupled between the second switch T2 and the third switch T3, and the other end of the second capacitor C2 receives the common voltage. The two ends of the second capacitor C2 has a second potential difference that is different from a first potential difference between the two ends of the first capacitor C1.

Figure 3:
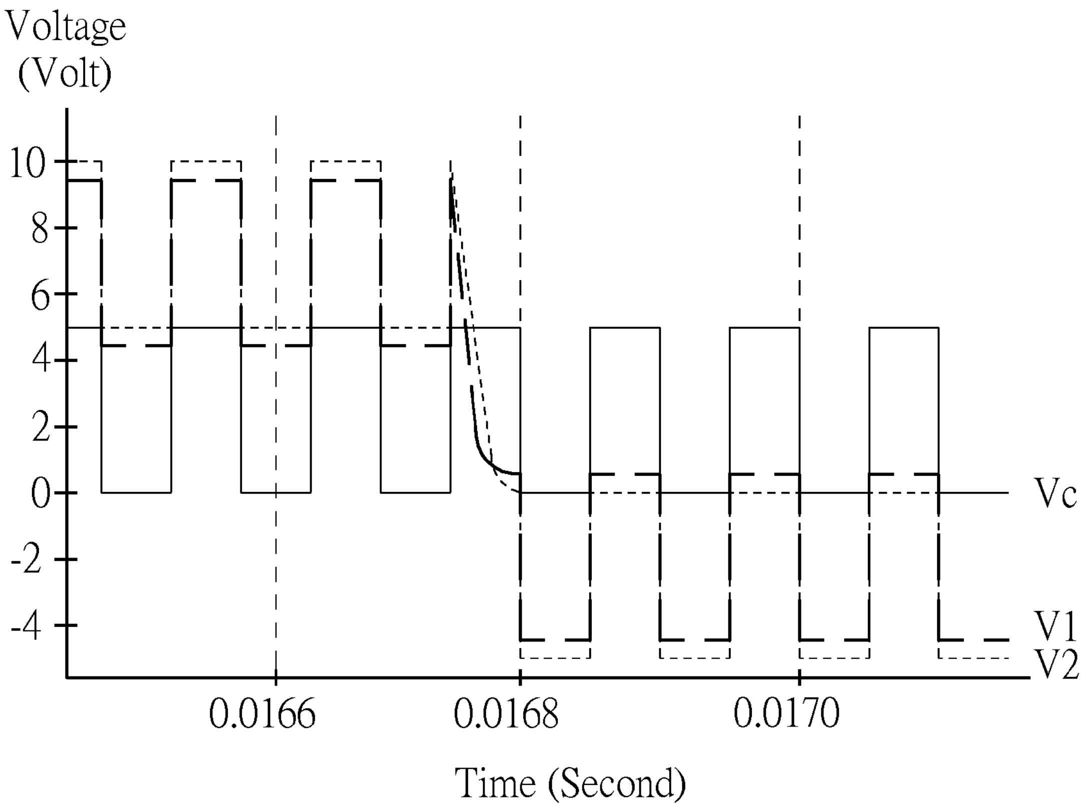
FIG. 3 is a sequence diagram of the common voltage and the pixel electrode voltages in the first and second display regions of the pixel circuit structure in FIG. 2.

The pixel circuit structure according to the first embodiment of the invention is simulated in the model of a normally white display panel during dark state with a transition operation mode of common voltages of 0 Volt and 5 Volt. FIG. 3 illustrates a timing diagram of the common voltage and the pixel electrode voltages in the first and second display regions of the pixel circuit structure in FIG. 2. For this simulation, the first display region is the transmissive area and the second display region is the reflective region. In addition, the ratio of the W/L ratio of the second switch T2 to the W/L ratio of the first switch T3 is 1:5 and the voltage source Vo is set to 3 Volt during positive half-cycles and 4.5 Volt during negative half-cycles. In FIG. 3, the first voltage V1 corresponds to the pixel electrode in the first display region, and the second voltage V2 corresponds to the pixel electrode in the second display region. According to the simulation result, during positive half-cycles (when the first and second voltages V1 and V2 are higher than the common voltage Vc), the pixel voltage in the transmissive area, namely the first voltage V1, is around 4.44 Volt and 9.44 Volt; the pixel voltage in the reflective area, namely the second voltage V2, is around 5 Volt and 10 Volt. That is to say, during positive half-cycles, the first potential difference between the two ends of the first capacitor C1 is 4.44 Volt, and the second potential difference between the two ends of the second capacitor C2 is 5 Volt. On the other hand, during negative half-cycles (when the first and second voltages V1 and V2 are lower than the common voltage Vc), the pixel voltage in the transmissive area, namely the first voltage V1, is around 0.5 Volt and −4.5 Volt; the pixel voltage in the reflective area, namely the second voltage V2, is around 0 Volt and −5 Volt. That is, during negative half-cycles, the first potential difference between the two ends of the first capacitor C1 is 4.5 Volt, and the second potential difference between the two ends of the second capacitor C2 is 5 Volt.

According to the above-described simulation result, the generating of the partial voltage by way of the second switch T2 and the third switch T3 results in a difference between the first voltage V1 and the second voltage V2 relative to the common voltage Vc. Further, if the above simulation is performed with the voltage source Vo as the common electrode of the LCD panel and provides the common voltage Vc, the first and second voltages V1 and V2 can still have different electric potential relative to the common voltage Vc. As the data line provides the same data signal, the liquid crystal molecules in the first display region and those in the second display region therefore have their respective tilt angles, such that the degree of matching between the transmittance-voltage (V-T) curve of the transmissive area and the reflectance-voltage (V-R) curve of the reflective area can be improved. As a result, the display quality of the LCD panel is further improved.

According to the first embodiment of the invention, the pixel circuit structure 200 is exemplified by its application in a transflective LCD panel. In another embodiment, the pixel circuit structure 200 can also be applied in a transmissive or transflective multi-domain LCD panel, in which the liquid crystal molecules in the first display region and the second display region are provided with different orientations. Because the first capacitor in the first display region has different electric potential from the second capacitor in the second display region, the tilt angle of the liquid crystal molecules in the first display region is different from that in the second display region when the data line L1 provides the data signal to the pixel circuit structure 200. Thus, the first display region and the second display region have different gamma curves, and the issues of color shifting in different view angles can be alleviated by the compensation of different gamma curves.

In the pixel circuit structure 200 according to the first embodiment of the invention, the second switch T2 and the third switch T3 are coupled between the data line L and the voltage source Vo. A partial voltage is generated between the second switch T2 and the third switch T3, so that the potential difference of the first capacitor C1 in the first circuit 21 is different from the potential difference of the second capacitor C2 in the second circuit 22. Therefore, in the transflective LCD panel, the degree of matching between the V-T curve of the transmissive area and the V-R curve of the reflective area is improved. Moreover, the pixel circuit structure 200 is suitable for use in normally white or normally black LCD panels. Further, the pixel circuit structure 200 of the present embodiment need not add additional material layers to alter the gap in the reflective area, and is therefore compatible to the manufacturing process of the TFT substrate in a single gap LCD panel. As a result, the manufacturing process can be simplified and the cost is lowered.

Further, the issue of color shifting from different view angles of the transmissive or transflective multi-domain LCD panel is alleviated in that the first and the second circuit 21, 22 are provided with different orientations of liquid crystal molecules and the first and the second display regions have different gamma curves.

Second Embodiment

Figure 4:
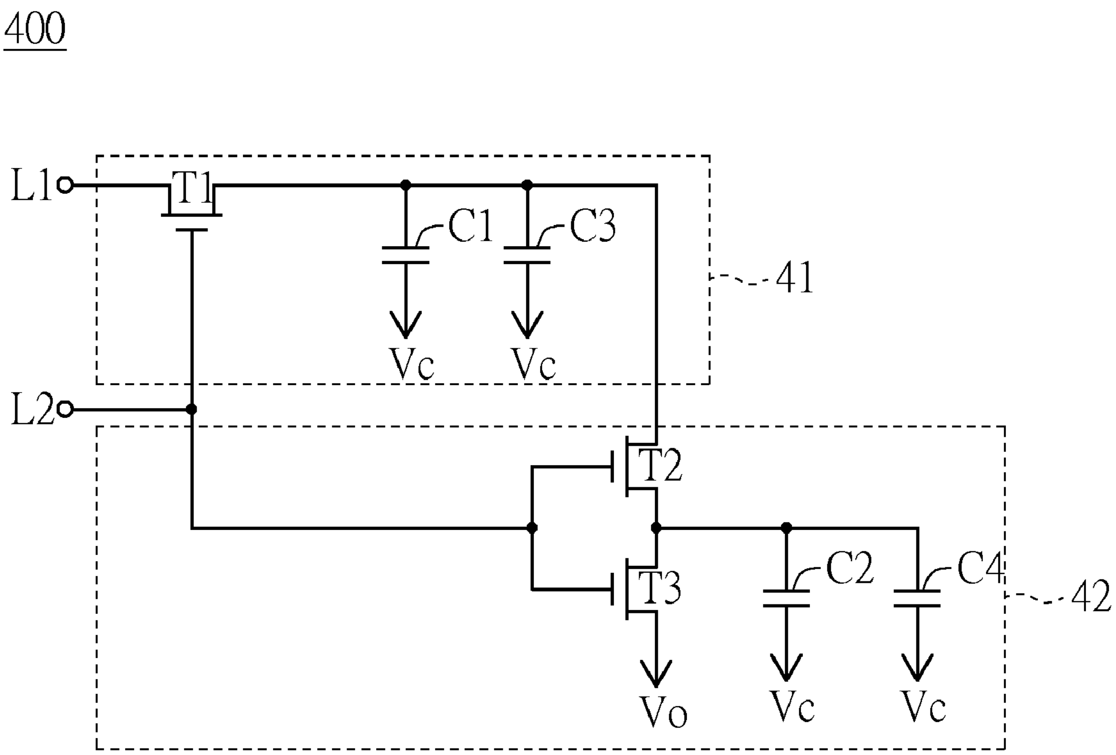
FIG. 4 is a perspective view of a pixel circuit structure according to the second embodiment of the invention.

Referring to FIG. 4, a perspective view of a pixel circuit structure according to the second embodiment of the invention is illustrated. As shown in FIG. 4, the pixel circuit structure 400 of the present embodiment is different from the above-described pixel circuit structure 200 of the first embodiment in the manner of how the second switch T2 is coupled to the data line L1 and therefore similarities between them will not be repeated for the sake of brevity hereinafter. In addition, same designations in the figures denote similar elements of the embodiments. The pixel circuit structure 400 is suitable for use in an LCD panel. The LCD panel has a common voltage Vc and includes at least one data line L1. The pixel circuit structure 400 includes a first circuit 41 and a second circuit 42. The first circuit 41 includes a first capacitor C1 and a first switch T1. The second circuit 42 includes a second switch T2, a third switch T3 and a second capacitor C2. One end of the first capacitor C1 receives the common voltage Vc. The first switch T1, the second switch T2 and the third switch T3 are coupled between the data line L1 and a voltage source Vo. The other end of the first capacitor C1 is coupled between the first switch T1 and the second switch T2. One end of the second capacitor C2 receives the common voltage Vc and the other end is coupled between the second switch T2 and the third switch T3. The potential difference between the two ends of the first capacitor C1 is different from that between the two ends of the second capacitor C2.

More specifically, the first switch T1, the second switch T2 and the third switch T3 are individually thin-film transistors. The source of the third switch T3 is coupled to the voltage source Vo. The first capacitor C1 and the second capacitor C2 are liquid crystal capacitors. The first circuit 41 further includes a first storage capacitor C3, and the second circuit 42 further includes a second storage capacitor C4. One end of the first storage capacitor C3 is coupled between the first switch T1 and the second switch T2. One end of the second storage capacitor C4 is coupled between the second switch T2 and the third switch T3. The first and the second storage capacitors C3 and C4 can be a storage capacitor on gate or a storage capacitor on common.

In the pixel circuit structure 400 of the present embodiment, the first switch T1, the second switch T2 and the third switch T3 are coupled serially between the data line L1 and the voltage source Vo. A partial voltage is produced between the second switch T2 and the third switch T3, and therefore the potential difference between the two ends of the first capacitor C1 is different from that between the two ends of the second capacitor C2.

The LCD panel is exemplified by a transflective LCD panel in the present embodiment, the first circuit 41 and the second circuit 42 are respectively disposed in the transmissive area and the reflective area. As a result, the degree of matching between the V-T curve of the transmissive area and the V-R curve of the reflective area is improved, further improving the display quality of the LCD panel. In addition, the pixel circuit structure 400 of the present embodiment is suitable for use in normally white or normally black LCD panels by altering the W/L ratios of the second switch T2 and the third switch T3 and adjustment to the potential of the voltage source Vo. The TFT substrate with the pixel circuit structure 400 is compatible to the well-known manufacturing process of the TFT substrate in a single gap LCD panel, which simplifies the manufacturing process and lowers the cost.

According to the second embodiment of the invention, the pixel circuit structure 400 is exemplified by its application in a transflective LCD panel. In another embodiment, the pixel circuit structure 400 can also be applied in a transmissive or transflective multi-domain LCD panel, when the first and the second circuits 41 and 42 are provided with different orientations of liquid crystal molecules, the corresponding display regions of different orientations of liquid crystal molecules have different gamma curves. Thus, the issues of color shifting in different view angles can be alleviated.

While the invention has been described by way of example and in terms of the first and the second embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pixel circuit structure applied in a liquid crystal display (LCD) panel that has a common voltage and comprises at least one data line, the pixel circuit structure comprising:

a first circuit comprising:

a first capacitor whose one end receives the common voltage; and a first switch; and a second circuit comprising:

a second switch;

a third switch, wherein the first switch, the second switch and the third switch are coupled serially between the data line and a voltage source, and the other end of the first capacitor is coupled between the first switch and the second switch; and a second capacitor whose one end receives the common voltage and the other end is coupled between the second switch and the third switch;

wherein the two ends of the first capacitor has a first potential difference and the two ends of the second capacitor has a second potential difference which is different from the first potential difference;

wherein the LCD panel further comprises at least one first display region and at least one second display region, and the first circuit is applied to the first display region and the second circuit is applied to the second display region.

2. The pixel circuit structure according to claim 1, wherein the LCD panel is a transflective LCD panel, and the first display region is a transmission area of the LCD panel and the second display region is a reflective area of the LCD panel.

3. The pixel circuit structure according to claim 1, wherein the LCD panel is a transflective LCD panel, and the first display region is a reflective area of the LCD panel and the second display region is a transmission area of the LCD panel.

4. The pixel circuit structure according to claim 1, wherein the gamma curve of the first display region is different from the gamma curve of the second display region.

5. The pixel circuit structure according to claim 1, wherein the first circuit further comprises:

a first storage capacitor whose one end is coupled between the first switch and the second switch, wherein the first storage capacitor is a storage capacitor on common or a storage capacitor on gate.

6. The pixel circuit structure according to claim 5, wherein the first capacitor is a liquid crystal capacitor.

7. The pixel circuit structure according to claim 5, wherein the second circuit further comprises:

a second storage capacitor whose one end is coupled between the second switch and the third switch, wherein the second storage capacitor is a storage capacitor on common or a storage capacitor on gate.

8. The pixel circuit structure according to claim 7, wherein the second capacitor is a liquid crystal capacitor.

9. The pixel circuit structure according to claim 1, wherein the voltage source provides the common voltage.

10. The pixel circuit structure according to claim 1, wherein the voltage source is an external signal source.

11. The pixel circuit structure according to claim 1, wherein the first switch, the second switch and the third switch are thin-film transistors individually, and the source of the third switch is coupled to the voltage source.

* * * * *

UNITED STATES PATENT AND TRADEMARK OFFICE

CERTIFICATE OF CORRECTION

PATENT NO. : 8,018,539 B2
APPLICATION NO. : 12/244906
DATED : September 13, 2011
INVENTOR(S) : Tsai et al.

It is certified that error appears in the above-identified patent and that said Letters Patent is hereby corrected as shown below:

ON THE TITLE PAGE:

Item (73) Assignee should be Wintek Corporation"

Signed and Sealed this
Sixth Day of December, 2011

David J. Kappos
*Director of the United States Patent and Trademark Office*